Figure 1:
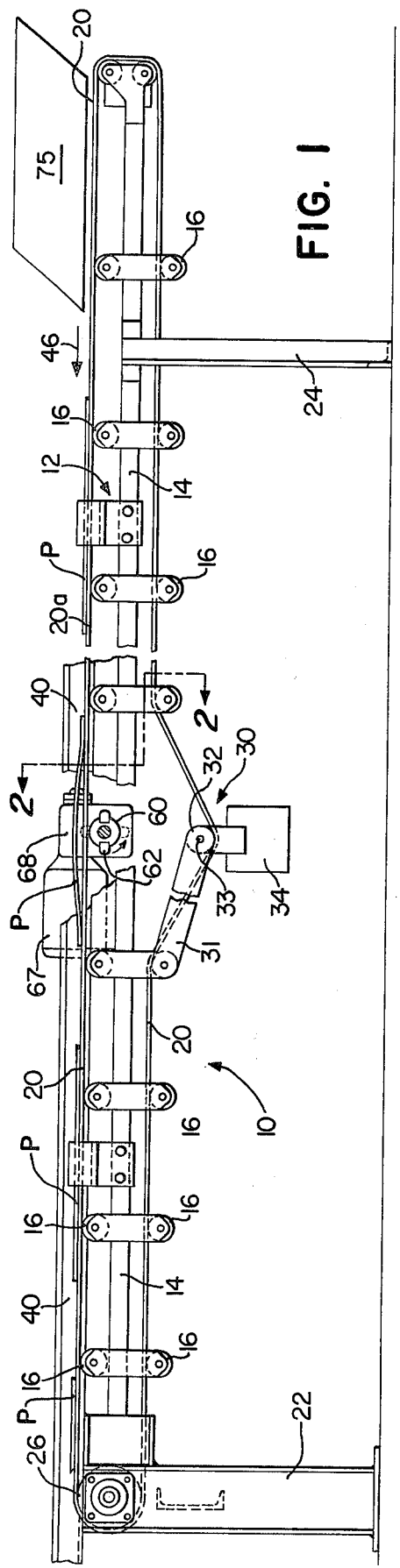

United States Patent [19]

Vandale et al.

[11] 3,921,795

[45] Nov. 25, 1975

[54] TIRE PLY STOCK EDGE ALIGNMENT

[75] Inventors: Leonard A. Vandale, Akron; James A. Obermeier, Clinton, both of Ohio

[73] Assignee: The Goodyear Tire & Rubber Company, Akron, Ohio

[22] Filed: Apr. 18, 1973

[21] Appl. No.: 352,367

[52] U.S. Cl. .................... 198/256; 198/29; 198/41; 198/DIG. 15; 271/250
[51] Int. Cl.² ......................................... B65G 47/24
[58] Field of Search ... 198/33 AB, DIG. 15, 33 AA, 198/41, 220 A, 220 BA, 29, 24, 246, 254, 256, 267; 271/49, 59, 52, 250

[56] References Cited
UNITED STATES PATENTS

| | | | |
|---|---|---|---|
| 1,499,614 | 7/1924 | Henninger | 198/24 X |
| 1,990,227 | 2/1935 | Fairchild | 198/29 UX |
| 2,380,910 | 7/1945 | Newton | 198/220 A |
| 3,165,196 | 1/1965 | Alfredeen | 198/41 |

Primary Examiner—Evon C. Blunk
Assistant Examiner—Douglas D. Watts
Attorney, Agent, or Firm—F. W. Brunner; R. S. Washburn

[57] ABSTRACT

A method and apparatus for receiving bias-cut or cross-cut pieces of tire ply building stock and transporting such pieces between a ply stock cutter and a splicing station while urging the cut edges of such pieces into common alignment parallel to their direction of movement from the cutter to the splicing station. The herein method and apparatus are particularly useful in so aligning metal wire reinforced, and relatively inextensible tire belt ply or breaker belt ply stock.

The foregoing abstract is not to be taken as limiting the invention of this application, and in order to understand the full nature and extent of the technical disclosure of this application, reference must be made to the accompanying drawing and the following detailed description.

9 Claims, 2 Drawing Figures

U.S. Patent  Nov. 25, 1975  3,921,795

TIRE PLY STOCK EDGE ALIGNMENT

The present invention relates to the manufacture of tires and particularly to the transport of cut pieces of ply stock between a ply stock cutter and a ply stock splicing station. Still more particularly, the invention provides for effectively transporting such cut pieces of ply stock while at the same time effectively aligning each successive cut piece with preceding cut pieces so that the plurality of pieces can be spliced into a well aligned continuous running length of spliced ply stock for assembly into a tire.

As is well known, the transport of cut pieces of ply stock received from a cross or bias-cutter to the splicing mechanism or manual splicing station has always been attended with some difficulty. Inasmuch as the ply stock at this stage in the manufacturing operation is always to some extent tacky, the stock is possessed of a tendency to adhere at least occasionally to the surface or surfaces on which it is being transported.

The present invention aims to overcome the mentioned disadvantage and to provide a simple and effective way of locating each of the successive cut pieces at a common line parallel to the direction of movement of transporting such cut pieces while effectively overcoming the tendency of the pieces to resist being moved laterally with respect to such common line and to accomplish the alignment of such pieces with a minimum of manual intervention.

Figure 2:
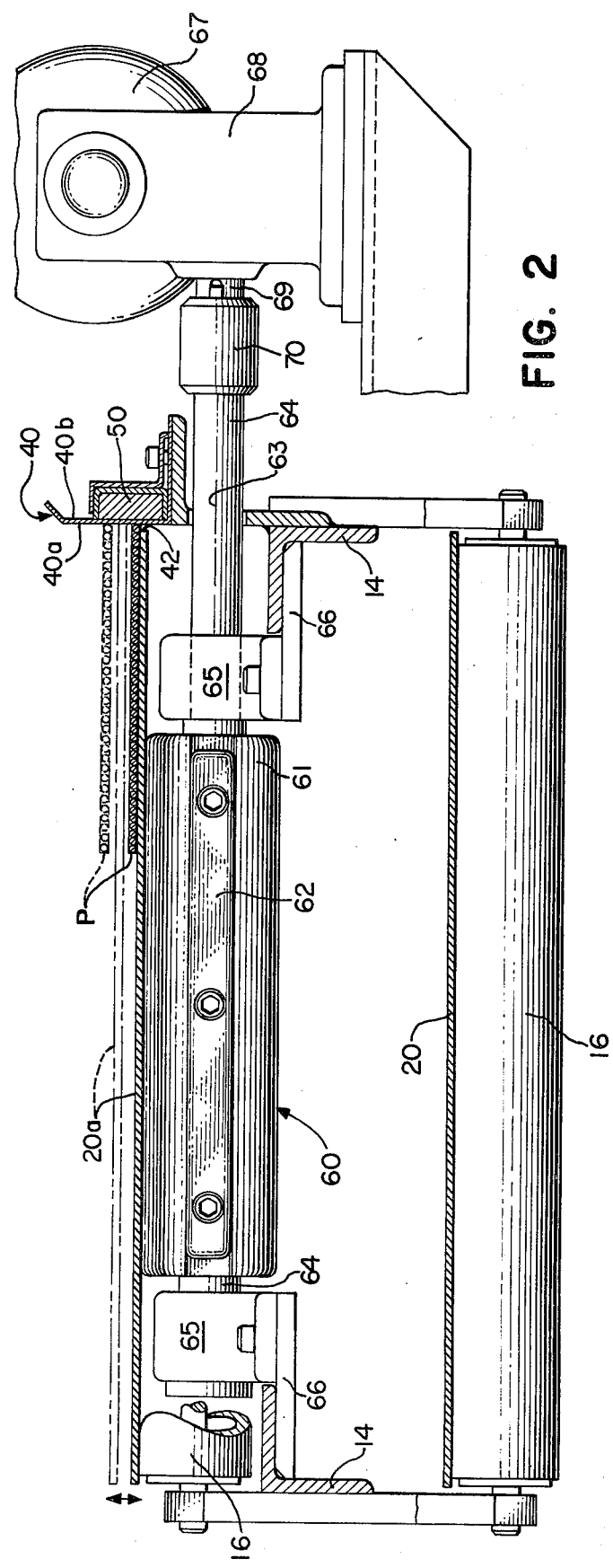

To acquaint persons skilled in the art with the principles of the invention, a preferred embodiment representing the present best mode of practice thereof, the following description sets forth a preferred apparatus and method by way of illustration, not to be considered as limitative of the invention itself, the scope of which is set forth in the appended claims. In the drawing:

FIG. 1 is a front elevation view of apparatus in accordance with the invention, and FIG. 2 is a transverse sectional view, enlarged, of the apparatus taken as indicated by line 2—2 in FIG. 1.

Referring to the drawings and particularly to FIGS. 1 and 2, the apparatus 10 comprises a conventional belt conveyor 12 including a longitudinal frame 14 on which are supported rotatably a plurality of conveyor belt carrying rolls 16 spaced along the longitudinal length of the endless looped flat belt 20. The frame is supported at a suitable elevation by legs 22, 24. A conventional belt drive, not shown, is connected to rotate the drive pulley 26 by which the belt 20 is caused to move to transport the respective pieces P of ply stock S. Suitable tension is maintained in the belt by conventional belt take-up 30 including a pivoted arm 31 carrying a belt-engaging roller 32 from the journals 33 of which is suspended a weight 34 or the equivalent.

The transport conveyor thus far described is entirely conventional.

In accordance with the invention, the longitudinal frame 14 of the conveyor supports a longitudinal guide 40 which extends along one edge 42 of the belt 20 parallel to the direction of movement, arrow 46, of the belt and towards which guide each of the respective successive pieces P of cut ply stock are moved laterally of the surface 20a of the belt. For inducing lateral movement of the stock pieces P toward the guide, means for inducing such lateral movement without direct contact with the stock pieces are mounted on the conveyor. In the apparatus 10 the guide 40 is constructed of a non-magnetic metal such as a stainless steel or its equivalent. In the apparatus 10 such lateral movement inducing means are supplied by attraction means operable to pull the tire belt ply stock pieces P toward the guide. Affixed to the guide surface 40a are a plurality of such ply stock attraction means herein provided by a plurality of commercially available permanent magnets 50 disposed at closely spaced intervals along the length of the guide 40 and of the belt 20, which is of any suitable length. Other magnetic means, such as electromagnets can be used, if desired.

Because of the previously mentioned tacky nature of such cut ply stock pieces, the lateral movement inducing means, in the form of the attraction means, such as the magnets 50, which are particularly useful with ply stock having reinforcement elements of metal cord, wire, or other magnetically attractable material, would not positively insure being able to move the stock laterally of the belt 20 to bring the cut edge of the respective piece into aligning contact with the alignment guide surface 40a and, in accordance with the invention, vibration means to periodically or intermittently release the ply stock piece P from the belt surface 20a are provided in the form of a whipper roll 60, one or more of such whipper rolls 60 being effective to vibrate the belt 20 normal to its width and to its direction of travel. The vibration of the belt effected by the whipper roll or rolls 60 is sufficient to intermittently or periodically release the cut piece P of ply stock from the transport belt surface 20a only sufficiently that the magnetic force of the magnets 50 on the ply stock can overcome any tendency to stick to the belt and so is sufficient to attract the stock and particularly the cut edge thereof nearer to the guide 40, into guiding contact with the longitudinal guide 40. It will be understood that a length of a portion which is being released or freed or bounced from the surface 20a by the, or each, vibrating means, measured in the direction 46, can be less than the full length of the piece, in which case the cut edge is moved progressively into contact with the guide 40 as the piece P is moved along the guide. It is possible, though not essential, that the entire length of the piece P be moved simultaneously.

A commercial form of magnetic device suitable for the purpose here is supplied by Bunting Magnetic Company of Franklin Park, Illinois, as a "Standard Channel Type Assembly," Part Number BM4929 in standard lengths of 36 inches. Preferably, the force field of the magnets 50 is located so that its maximum force is parallel to and elevated slightly above the surface of the belt so as to tend slightly to lift the nearer edge of the ply stock rather than to urge such edge downwardly against the belt. The magnets 50 extend longitudinally nearly the full length of the guide 40. For narrow and/or thin ply stock, it is sometimes desirable to lessen the magnetic force, for example, by inserting shims between the magnets 50 and the surface 40b.

The or each whipper roll 60 comprises a cylinder 61 having a plurality of bars 62 fixed thereon at angularly spaced intervals about its circumference and extending parallel to its rotational axis 63. The roll 60 is corotatably and coaxially mounted on a shaft 64 carried by bearings 65 mounted on brackets 66 secured on the transport conveyor longitudinal frame 14. The shaft 64 is coupled conventionally to a small motor 67 by way of a right-angle gear reducer 68 having an output shaft 69 corotatable with the shaft coupling 70. The roll is driven at any convenient speed sufficient to provide the necessary vibration by which the belt stock is intermittently relieved or bounced from the surface of the transport belt. Rotation of approximately 170 to 175 rpm provides a frequency of impact, with two beater bars, of 340 cycles per minute, which has been found satisfactory for aligning wire reinforced breaker belt tire fabric for passenger and light truck tires. Higher or lower frequencies can readily be found suitable for differing size and weight of the stock pieces and/or of the conveying belt. The vertical movement of the belt, in consequence of the vibration, is quite small; for example ⅛ inch to ⅝ inch (or 3 to 15 millimeters) have been found satisfactory in use of the apparatus 10. Other well known vibration means can be provided, if desired.

The conveyor belt is disposed across the cutting mechanism 75, at least approximately parallel to the knife or other cutting device and thus to the cut edges of the pieces P of ply stock. Such cut pieces are dropped from the cutter to the belt in any suitable manner. The rate of travel of the belt which can be continuous or intermittent is such that the cut pieces P are disposed on the transport belt 20 at spaced intervals and without overlap of the respective ends. As the pieces move longitudinally with the belt 20, the vibration of the belt surface 20a which is effected by the roll 60 releases the cut pieces, particularly the affected longitudinal portions released by the, or each, vibration means, successively and momentarily from the surface of the belt so as to permit movement of each piece P progressively, or even simultaneously, laterally of the belt 20 to place the cut edge in aligning contact with the longitudinal guide 40 in response to the lateral forces exerted on the cut pieces, the magnetic force acting through the guide on the magnetically responsive, or wire cord reinforcing elements of the ply stock. It should be noted that the lateral movement inducing means does not directly engage the stock ply pieces at any time.

Having been precisely aligned by the guide 40 by being drawn thereagainst by the magnetic attraction of the permanent magnets 50, the successive pieces are moved endwise into splicing relation and then joined to form a continuous running length of ply stock which can then be wound into a supply roll for delivery to the tire building operation. The splicing and the winding of such supply roll forms no part of the present invention and, being familiar to those skilled in the art, is not further described herein.

While certain representative embodiments and details have been shown for the purpose of illustrating the invention, it will be apparent to those skilled in the art that various changes and modifications may be made therein without departing from the spirit or scope of the invention.

What is claimed is:

1. A method of handling cut pieces of ply stock for building tires comprising receiving said pieces from a ply stock cutter on a movable transport surface, moving said transport surface and said pieces together longitudinally parallel to a guide surface toward a splicing station, and vibrating said transport surface intermittently sufficiently to release said pieces from said transport surface while exerting a lateral force on said pieces sufficient to urge a longitudinal cut edge of each such piece into aligning contact with said guide surface, to align said pieces with respect to a common longitudinally extending line for subsequently joining the so aligned pieces in end-to-end relation.

2. The method as claimed in claim 1, wherein said lateral force is exerted by lateral movement inducing means spaced from and out of direct contact with said stock pieces.

3. The method as claimed in claim 1, wherein said lateral force is exerted by magnets.

4. The method of claim 2, wherein said vibrating is effected by at least one rotatable roll having elements periodically striking the transport member beneath said pieces of cut ply stock.

5. The method according to claim 1, wherein said moving is effected by a surface of an endless belt.

6. An apparatus for transporting cut pieces of ply stock for building tires and aligning said pieces in longitudinal alignment comprising a longitudinally movable transport surface, said surface consisting of an endless flat belt having a transversely level surface and extending between a ply stock cutter and a ply stock splicing station for receiving cut pieces of such stock one at a time from said cutter and transporting them in end-to-end sequence toward said station, an alignment guide extending parallel to the direction of movement of and adjacent to said surface, vibrator means comprising a roll having at least one beater element extending lengthwise thereon for striking said belt, said roll being mounted for rotation about an axis parallel to and beneath said transport surface and operable to vibrate said surface normal to its width and length sufficiently to release said pieces intermittently from lateral movement inhibiting contact with said surface, and means for inducing lateral movement of said pieces tending to move them toward said guide.

7. The apparatus as claimed in claim 6 and wherein said stock includes magnetically attractable reinforcement elements, said means for exerting lateral force comprising a plurality of magnets mounted along said guide to exert magnetic attraction through said guide on said pieces.

8. An apparatus for transporting cut pieces of tacky ply stock for building tires and for realigning said pieces to common longitudinal alignment with one another comprising a longitudinally extending planar transport surface extending between a ply stock cutter and a ply stock splicing station to receive cut pieces of such stock one at a time thereonto from said cutter and for transporting them in end-to-end sequence toward said splicing station, a single alignment guide extending normal to said surface and parallel to the direction of movement of said end-to-end sequence and adjacent to one longitudinal edge of said surface, vibrator means operable to vibrate said surface normal to its width and length sufficiently to reduce the effect of the tack between said ply stock and said surface, and means for inducing lateral movement of said pieces tending to move them laterally toward said single guide.

9. An apparatus for transporting cut pieces of ply stock including magnetically attractable reinforcement elements for building tires and for aligning said pieces in longitudinal alignment comprising an endless flat belt having a transversely level surface extending between a ply stock cutter and a ply stock splicing station for receiving thereonto cut pieces of such stock one at a time from said cutter and transporting them in end-to-end sequence toward said station, an alignment guide extending parallel to the direction of movement of and adjacent to one edge of said surface, a roll having at least one beater element extending lengthwise thereon for striking said belt roll being mounted for rotation about an axis parallel to and beneath said surface and operable to vibrate said belt sufficiently to release said pieces intermittently from lateral movement inhibiting contact with said surface, and a plurality of magnets mounted along said guide to exert magnetic attraction through said guide and operative to induce lateral movement of said pieces tending to move them toward said guide.

* * * * *